Dec. 25, 1945.    S. T. HOWARD    2,391,460
PORTABLE RANGE
Filed March 19, 1941    6 Sheets-Sheet 1

Inventor
Styles T. Howard.
By William F. Desmond
Attorney

Dec. 25, 1945.   S. T. HOWARD   2,391,460
PORTABLE RANGE
Filed March 19, 1941   6 Sheets-Sheet 3

Inventor
Styles T. Howard.
By William F. Desmond
Attorney

Dec. 25, 1945.  S. T. HOWARD  2,391,460
PORTABLE RANGE
Filed March 19, 1941  6 Sheets-Sheet 4
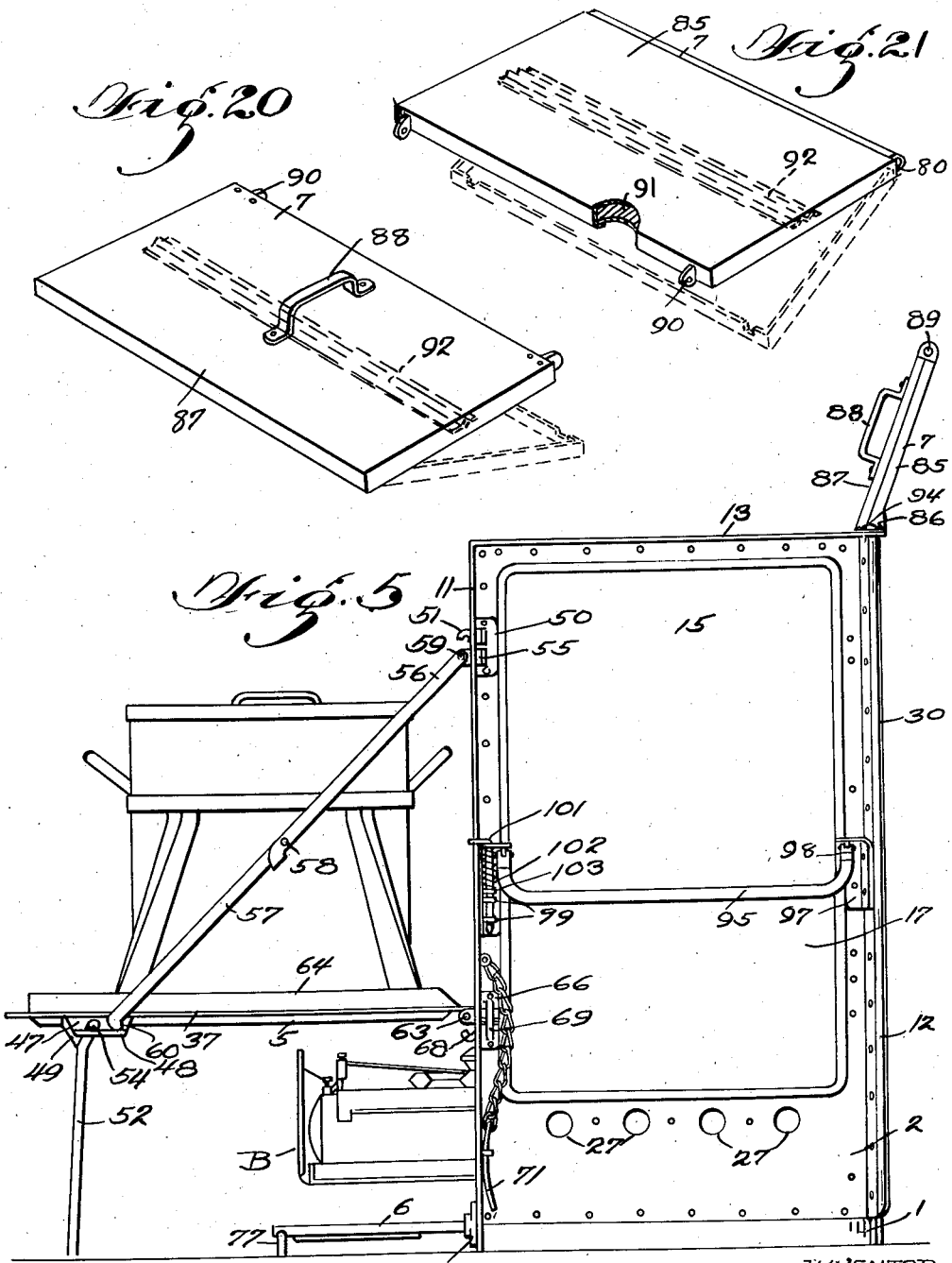

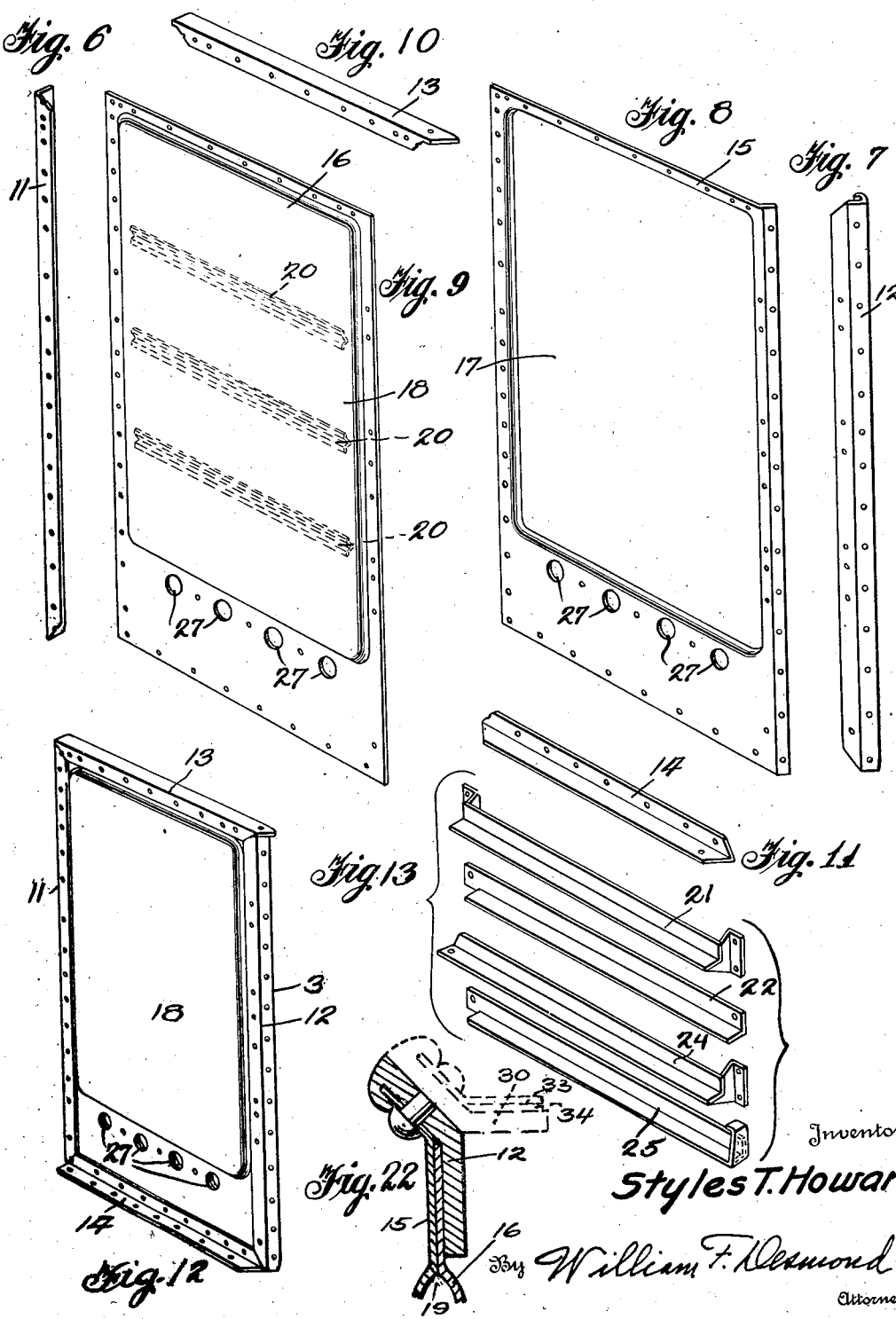

Dec. 25, 1945.  S. T. HOWARD  2,391,460
PORTABLE RANGE
Filed March 19, 1941   6 Sheets-Sheet 6
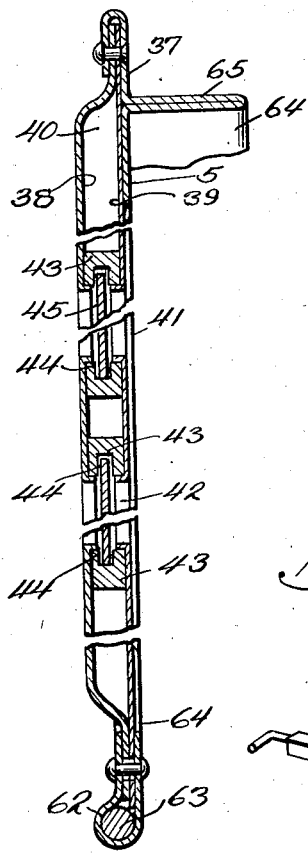
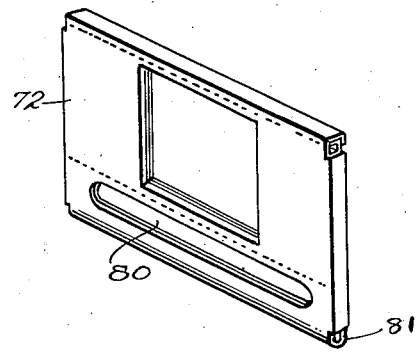
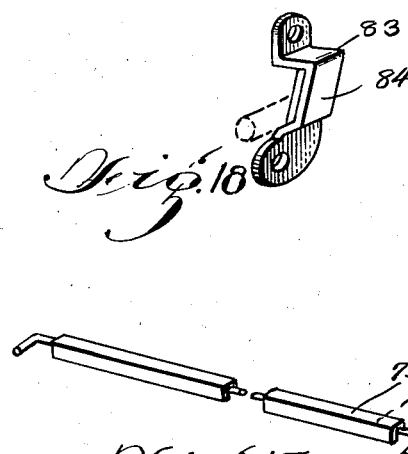
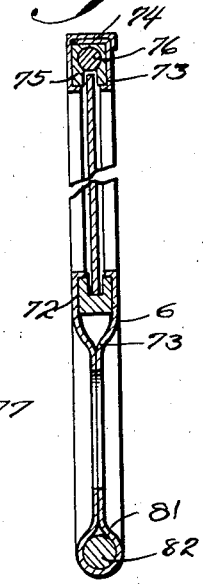
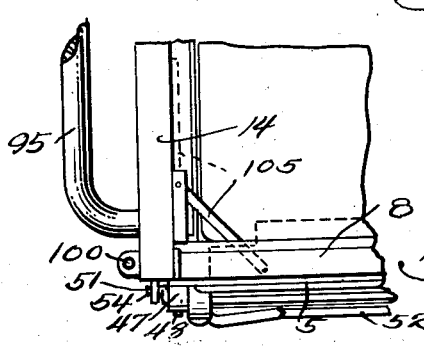
INVENTOR.
Styles T. Howard
BY William F. Desmond
ATTORNEY Patented Dec. 25, 1945

2,391,460

UNITED STATES PATENT OFFICE 2,391,460

PORTABLE RANGE

Styles T. Howard, Jeffersonville, Ind.

Application March 19, 1941, Serial No. 384,961

4 Claims. (Cl. 126—1)

(Granted under the act of March 3, 1883, as amended April 30, 1928; 370 O. G. 757)

The invention described herein, if patented may be manufactured and used by or for the Government for governmental purposes without the payment to me of any royalty thereon.

This invention relates to improvements in ranges and the method of constructing same and, more specifically, to a portable gasoline field range adapted for use by the Army, the Navy, at C. C. C. camps, R. O. T. C., Boy Scout camps, and on any other occasion where large numbers of persons are to be provided with cooked food in a short period of time. Further, a range is provided which is sufficiently sturdy for field service, within weight limits for ready handling, adapted for operation while in transport on escort wagons, railroad cars, motor vehicles, steamboat or set up on the ground, and capable of using wood as emergency fuel and of preparing a varied menu of well-cooked food for approximately one hundred men.

The range is preferably constructed in small units of relatively small capacity and weight, adapted to be readily handled by two men. Each unit is complete in itself, and the number of units needed to provide the volume of food required may be joined together as herein described.

While the range here shown and described is primarily designed for field and other general portable purposes, it is equally as efficient when used in barracks and under other permanent and enclosed conditions, it having been found that with the type of fire unit forming a part of the equipment of this improved range, which is covered in separate applications, Serial No. 390,121, filed April 24, 1941, and Serial No. 406,203, filed August 9, 1941, and in Patent No. 2,299,749, granted October 27, 1942, no provision is required for carrying off products of combustion when the fluid fuel, which is preferred, is used, provided the enclosure is reasonably large and well ventilated.

The objects of this invention are to provide a simple, durable, inexpensive and efficient device of the class described, adapted to perform a variety of cooking operations promptly by convenient means and at low cost.

A further object is to provide a range of such simple construction that it will permit of its successful operation with little preliminary instruction.

Further objects are to provide a range of a durable character, having a well-braced rectangular frame of metal angles, arranged in such a manner as to withstand the shocks and jars to which the range will be subjected during transportation and repeated loading and unloading, into and from vehicles, said frame being further braced by reinforced wall sheets, formed by being pressed out in opposite directions, not only to provide rigid wall members, but also, when assembled, an air space between the sheets of the walls for insulation purposes. Said frame is preferably constructed of aluminum alloy angles welded together and said wall sheets of aluminum alloy and stainless steel, which when riveted in place on the frame, provide a durable and substantial structure capable of withstanding the rough usage to which a device of this character will be subjected, and also of supporting satisfactorily the heavy cooking utensils with their contents.

A further object is to provide a range having an unobstructed interior wherein cooking utensils of various sizes and shapes may be arranged in various positions and also one adapted to receive a removable fire unit at various elevations.

A further object of this invention is to provide a range constructed of relatively inexpensive stock material, obtainable promptly in large quantities, the parts of which, with the use of a few simple dies, punches, small welding and riveting apparatus, and with practically no machine work, may be prepared and the range completely fabricated at comparatively low cost and in large quantities when necessary.

Another object is to provide a range of a weight that can be readily lifted by two men into a truck or other vehicle and of a size to permit the arrangement of one or more ranges across the front of a truck, the range or ranges facing to the rear with space in rear of the ranges to operate same.

A further object of this invention is to provide a range wherein the parts are, as far as possible, permanently secured together to prevent loss during operation or transportation from place to place.

A further object is to provide a range especially adapted for the use of a fluid fire unit and means whereby the unit may be moved to different positions to provide the most effective cooking operations and economy of fuel, said cooking operations being effectively accomplished where desired while the range is being transported at high speed without loss of or damage to the food.

A further object is to provide a range primarily for the use of a fluid burning fire unit but in which, should the emergency arise, means are provided for the use, as fuel, of wood, coal, charcoal, coke, or any other form of combustible solids, said means being a folding grate nested in the bottom of the range.

A further object is to provide a range of moderate cooking capacity as a complete unit to meet limited requirements, to which other units may be conveniently added to provide cooking capacity required for large organizations and also to provide for an increased variety of foods that may be simultaneously prepared.

With the above and other objects and advantages in view, the invention consists of features of construction and arrangement and operation of parts, which appear in the specification and be fully pointed out in the claims.

A preferred embodiment of the invention is shown, but it will be understood that slight changes in form and minor details of construction may be resorted to without departing from the spirit of the invention or falling beyond the scope of the claims.

Similar numerals indicate corresponding parts in all the figures of the drawings in which:

Figure 5 is a side elevational view of the range showing the cooking pot or boiler drawn forwardly on the opened door and the fire unit partly withdrawn.

Figure 1:
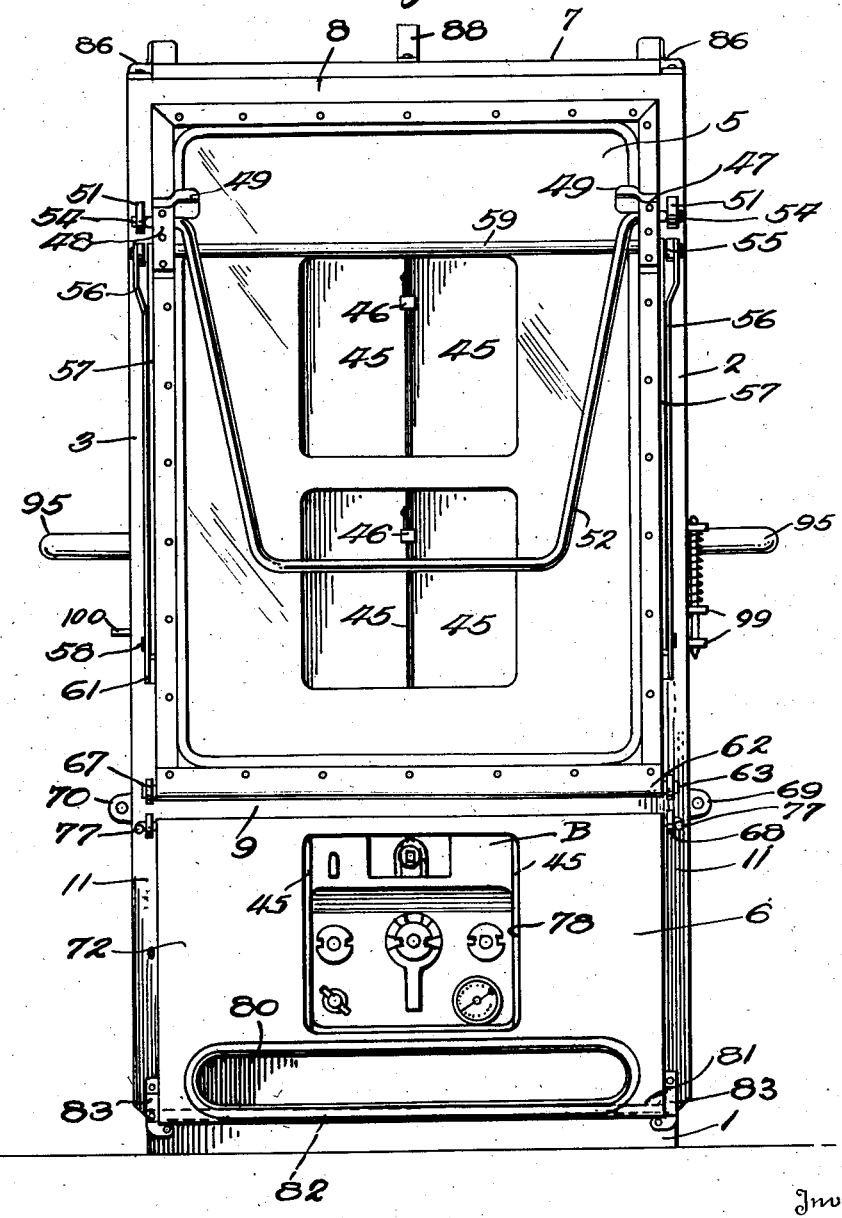
Figure 1 is a front view of a range unit.

Figures 6–11 inclusive are perspective views of the front and rear corner members, outer and inner side sheets and top and bottom angle members, respectively, of the left side wall of the range.

Figure 12 is a perspective view of the assembled side wall.

Figure 13 is a perspective view of one set of the slides which are attached to the inner face of the side wall.

Figure 14 is a vertical sectional view of the upper range door.

Figure 15 is a perspective view of the lower range door.

Figure 16 is a vertical sectional view of the lower range door on a larger scale.

Figure 17 is a detail perspective view of the latch bar of the lower door.

Figure 18 is a detail perspective view of one of the hinge brackets for the lower door.

Figure 19 is a plan view of a corner of the range with the lid lifted.

Figure 20 is a perspective view of the front member of the lid, showing the inner wall in broken lines and separated from the outer wall.

Figure 21 is a perspective view, similar to Figure 20, of the rear member of the lid.

Figure 22 is an enlarged transverse sectional view of the joint between the side and rear walls of the range.

Reference now being had to the drawings by numerals, 1 indicates the base, 2 the right side, 3 the left side, 4 the back, 5 the upper front door, 6 the lower front door, and 7 the top of the range. At the upper front portion of the range is a cross brace 8 and there is also provided a lower front cross brace 9 arranged at the base of the upper front door. A cross brace 10 is arranged across the back of the range as a bumper for receptacles pushed into the range on a slide in line therewith.

The base preferably consists of suitable metal channels secured together to form a rectangular frame on which the parts of the range are mounted.

The sides of the range are rights and lefts, but are otherwise identical, with the exception of coupling members adapted to secure two range units together. Only one of the sides, namely, the left side, will be described in detail and is shown in Figs. 6 to 13 inclusive. The side consists of vertical front and rear corner angles 11 and 12, upper and lower angles 13 and 14, outer and inner plates 15 and 16 having panels pressed out in opposite directions as shown at 17 and 18 respectively, to provide an air space 19 for insulation purposes, the paneled portions of said plates being held in their separated positions by spacers 20. The parts shown in Figs. 6 to 11, inclusive, when riveted together, will form the structure shown in Fig. 12.

In Fig. 13 of this sheet of drawings is shown one of the slide members 21, mounted on the inner surfaces of the right and left sides of the range, on which a broiler or roasting pan A or other cooking utensil may be supported in position within the range. Intermediate upper and lower slides 22 and 23 are mounted on the sides of the range in spaced relation beneath slides 21 and are adapted to support a heating unit B within the range in various positions when required. Slides 24 are mounted on opposite sides of the range in line with the upper front door when in its lowered position. Slides 25 are mounted on opposite sides of the range adjacent to the bottom or base thereof, adapted to support the fire unit B in its lowermost position. Beneath the slides 25 a folding grate is arranged as shown at 26, the latter being provided for an emergency wherein gasoline, which is the fuel ordinarily used, is not available. The grate forms the subject matter of my Patent No. 2,292,377, granted August 11, 1942. The plates of the side members are provided at their lower portions with aligned openings 27, over which a slide damper 28 is mounted for the control of circulation of air within the range.

Figure 2:
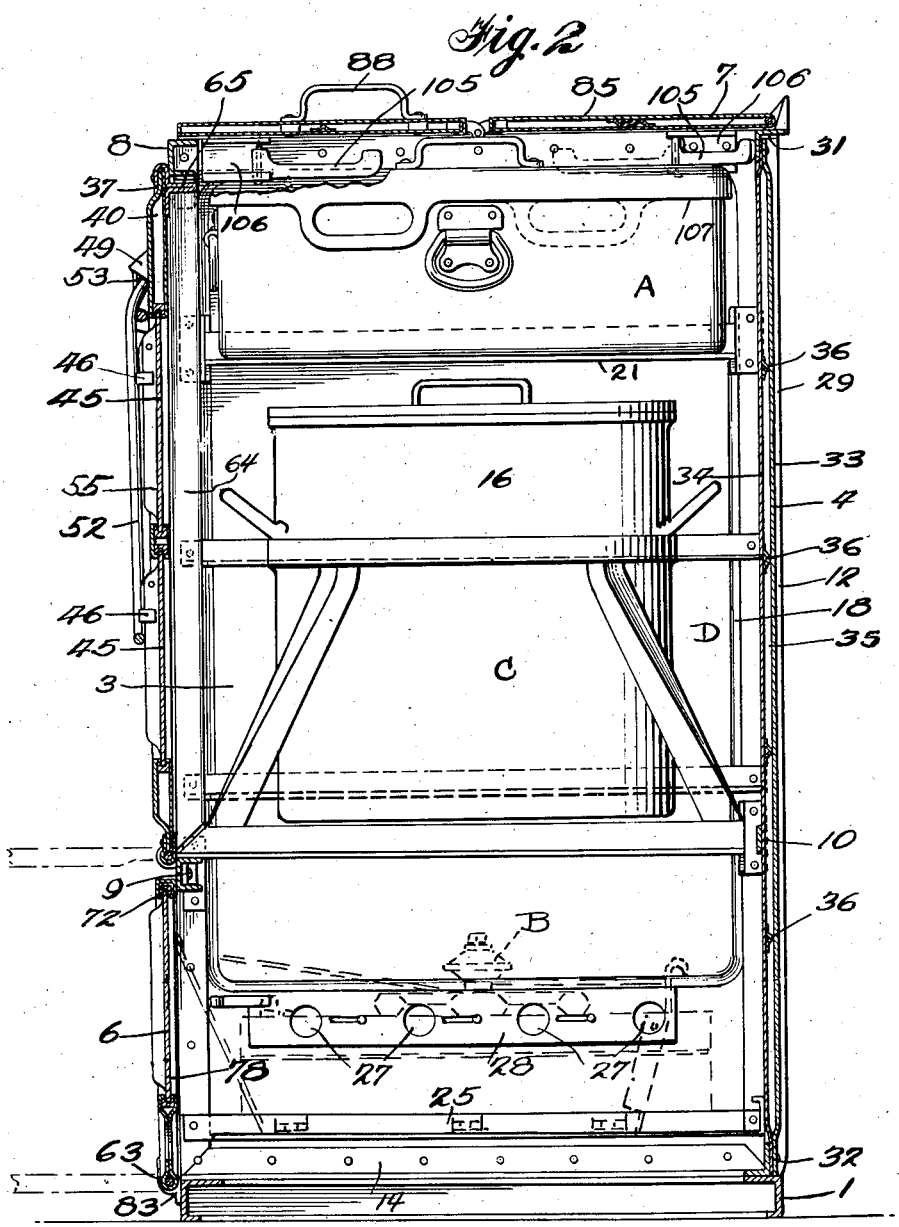
Figure 2 is a vertical sectional view of the range with the parts in position for boiling and roasting or baking, the fire unit being shown in broken lines.

The construction of the back of the range is practically the same as that of the sides, and consists of vertical corner angles 30, upper and lower angles 31 and 32, and outer and inner plates 33 and 34 with panels pressed out in opposite directions to provide an air space 35 for insulation purposes, said space being maintained by spacers 36. The back brace 10 is shown in Fig. 2.

The further illustration on an enlarged scale of the assemblies between the side and rear walls of the range will be seen in Figure 22, indicating the manner of clamping the inner and outer plates to the corner angles outside of the raised panels of the plates.

The upper front door of the range is shown in section in Figure 14. In the door 5 a pressed metal frame 37 is provided on which outer and inner plates 38 and 39 are mounted, said outer plate being formed with a panel pressed outwardly to provide an air space 40 when the plates are assembled and mounted in the frame 37. Upper and lower openings 41 and 42 in the outer and inner plates are in alignment when said plates 38 and 39 are assembled and spacers 43 are arranged above and below said openings 41 and 42 having grooves 44 in which shutters 45 are adjustably mounted. A locking latch 46, see Figure 1, is arranged to lock flanges on the shutters to maintain them in closed position across the openings or be released and permit the openings of the shutters for access to the instrument panel or control of the fire unit in either of its upper positions.

The upper front door is provided at its edges, near its top, with bearing brackets 47, having keeper plates 48 and stop lugs 49. Mounted on the frame, adjacent to said bearing brackets 47 are latch and hinge brackets 50, provided with a notched latch lug 51. A combined latch and support 52 of generally U-shape having crank-shaped ends 54 is mounted in the upper bearing grooves 53 of the bearing brackets 47. The outer ends 54 of the combined latch and support 52 engage the notched lugs 51 when the upper door is closed and lock same in its closed position when the latch is forced down flush with the face of the door. As a part of the latch and hinge brackets 50 is a pivot lug 55 on which is pivotally mounted the upper end of the upper stay hinge 56. Lower stay hinge 57 is pivotally connected to the upper stay hinge by means of a pivot pin 58. The free end of the lower stay hinge has mounted therein a cross rod 59 connecting the lower stay hinge members together across the front of the door, said cross rod being mounted for rotary movement in the lower bearing groove 60 of the bearing brackets 47. A lug 61 is provided at the lower end of the upper stay hinge to limit the swing of the lower stay hinge on said upper stay hinge. The upper door is provided along its lower edge with a loop 62 through which a hinge rod 63 extends and projects a short distance beyond the side ends of the loop. Said projecting ends are mounted in bearing ears 67 forming a part of brackets 66 mounted on the frame at either side of the door. In the vertical position of the door the latch above referred to locks same in its closed position. When the door is swung into its horizontal position to form a shelf, or the like, the combined latch and support 52 swings out slightly beyond a vertical position or in a downward and outward position for the purpose of preventing accidental inward displacement of the support. The support prevents the tilting forward of the range should a heavy weight be placed on the upper door in its horizontal position.

The upper door, as stated above, is preferably constructed of a pressed metal frame which is provided on its inner face with side rails or guides 64 and a stop cross rail 65 at its outer end when in its lowered horizontal position. Said side rails, when the door is in its lowered position, form a continuation of the slides 24 mounted on the sides of the range. Said arrangement permits the removal of a food receptacle, such as a boiler or cook-pot C, from the range to a position outside of the range on the door, which permits free access to the contents of the container for serving. In order to support the cook-pot C, which is of smaller cross-sectional area than the casing, a cradle D having a base adapted to engage the slides 26 and guides 64 is provided. The cradle support for the cook-pot C forms the subject matter of my Design Patent No. 138,395, granted August 1, 1944.

Brackets 66 are arranged practically in line with the lower front cross brace of the range and provide not only bearing ears 67, as above described, for the lower end of the upper front door, but also provide for a lug having a notch 68 directly beneath the aforesaid bearing ears 67. The lugs 68 are adapted to receive a rod 76 extending laterally from the side edges of the upper portion of the lower door 6. The bracket 66 on the right side of the range is provided with a female coupling lug 69 and bracket 66 on the left-hand side of the range is provided with a male coupling lug 70, each provided with perforations, through which, when two ranges are brought together with the perforations in register, a captive pin 71 may be inserted to lock the adjacent sides of two ranges together.

The lower front door 6 consists of outer and inner plates 72 and 73, preferably bent on themselves and joined at their free ends at the top, as shown at 74. Mounted at the top of the door is a spacer member 75, through which a rod 76 extends and projects as at 77 beyond the ends of the door, said extensions 77 being bent forwardly and adapted to engage notches 68 of the bracket 66 when the door is in its upper and closed position.

An opening 78 is provided in the lower front door and slidable shutters 45 are provided as closures for said opening 78, which provides access to the interior of the range and the fire unit when the latter is in its lower position. Beneath said opening 78 in the door 6 is a circulation opening 80. In the structure shown, the lower front door is provided with a loop 81 through which a pivot rod 82 extends and projects beyond the ends of the door and rests in hinge brackets 83. The bracket 83, Figure 18, has an elongated bearing socket 84 incrasing in width towards its upper end, which is thereby adapted to permit free movement of the door in an upward direction. When the door is lowered and the ends 77 of the upper rod engage the notched lugs 68 on brackets 66 the door will be forced snugly up against the face of the side members of the range.

The top of the range is closed by a divided lid comprising a rear member 85 mounted in pivot and stop brackets 86. A forward member 87 of the lid is provided with a lifting handle 88 and is hinged to the rear member by rod 89 passing through eyes in lugs 90 projecting from spacer blocks at the adjacent edges of the front and rear lid members. The members of the lid are constructed in practically the same manner by folding metal to form an air space 91 for insulation purposes, said air space being maintained and the lid members reinforced by spacer members 92. Brackets 86 are provided with pivot sockets 93 and stop lugs 94, it being obvious that when the lid is grasped by the handle and forced upwardly and backwardly it will pivot at the center and come up against lugs 94 at the rear of the range in a slight backward inclination which will, through gravity, maintain the lid in its open position.

Folding lifting handles 95 are provided on the sides of the range and are pivotally supported on front and rear brackets 96 and 97 respectively, mounted on the front and rear corner uprights of the range, the handles being provided with stops 98 that prevent the handles swinging upwardly beyond a horizontal position. The handles will fold down against the sides of the range within the space required by the other projections beyond the sides of said corner uprights of the range.

The forward right-hand bracket 96 of the handle 95 is provided with lugs in which aligning perforations are provided for securing adjacent range units together. The left front bracket 96 of each range is provided with a lug 100 which, when two ranges are to be secured together, rests between the lower lugs 99 of the bracket 96 mounted on the right-hand side of the adjacent range. A pin 101 mounted in the lugs 99 is slidably mounted in the perforations therein and is pressed downwardly by spring 102 and washer 103, which engages a projection or split pin on the pin 101. The pin 101 may be lifted against the tension of said spring to a position with the pin elevated above the bottom lug to permit the insertion of lug 100 of the adjacent range between the lower lugs 99, thus coupling adjacent ranges together at a point above the coupling 69, 70 formerly described.

Swinging, locking and supporting members 105 are mounted on brackets 106 adjacent to the top of the interior of the range, adapted to lock in place the lid 107 of a cooking utensil such as the broiler or roasting pan A as shown, said lid being provided with a deep flange and adapted when desired to be inverted and rest in its reversed position on said members 105 and be used as a griddle or frying pan. The broiler A is of substantially the same shape in plan as the casing, but somewhat smaller, as shown, so that the heated gases from the burner rise around the broiler and escape through the restricted space, as through a flue.

As above described, it will be seen that all the objects in view have been accomplished and that the entire range comprises a cabinet having an interior free from obstruction throughout and of a sturdy nature, yet at the same time one wherein means are provided for arranging cooking utensils of different sorts and capacities at various elevations within the range. A fire unit is provided for the range which can be placed at different elevations, and which, in its preferred form, is practically the width and general dimensions of the interior of the range, but of small vertical dimensions. In operation the range may be used singly or in groups of any preferred number secured together, in any form of vehicle for transportation purposes or arranged on the ground or in barracks, or it may be used under various other conditions to meet the requirements.

Figure 3:
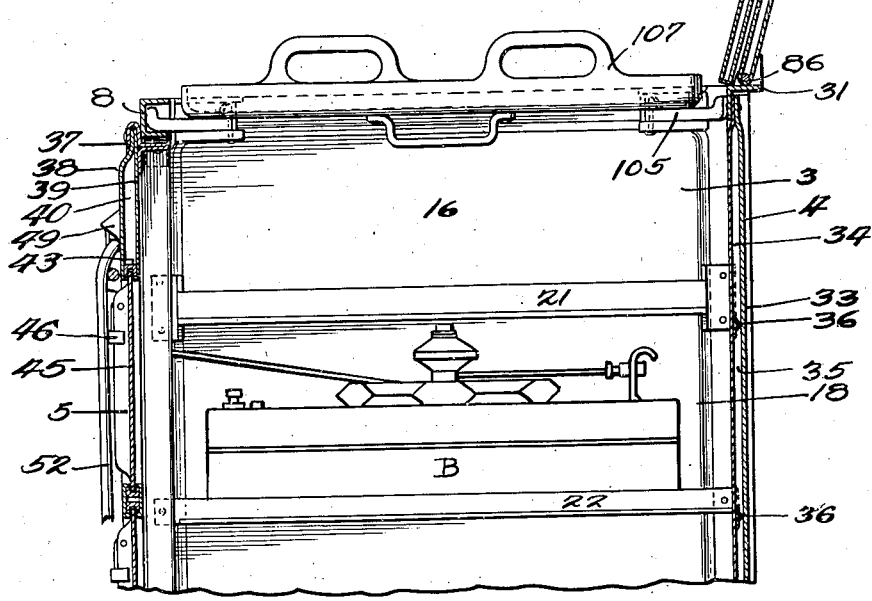
Figure 3 is a vertical sectional view of the upper part of the range set up for frying in the griddle, the fire unit being shown diagrammatically.
Figure 4:
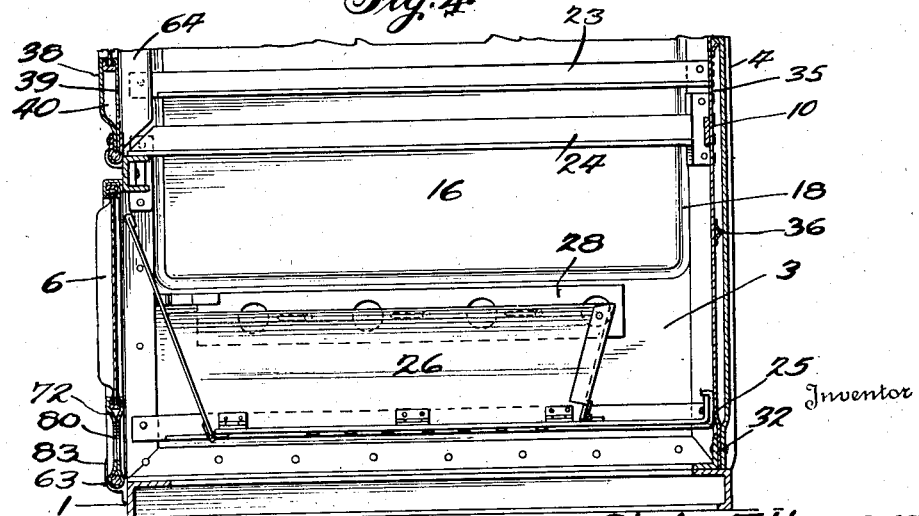
Figure 4 is a vertical sectional view of the lower part of the range with the solid fuel grate substituted for the fire unit.

The range may be set up with the fire unit B on the bottom slides 25, the cook-pot C in the cradle D on the slides 24, and the roasting pan A on the upper slides 21. In this case heat is generated by the fire unit to keep the cook-pot containing fifteen gallons of water boiling, and enough heat passes through the spaces around the cook-pot to maintain a temperature of 500° in the roasting pan, which has a capacity of ten gallons. In case it is not desired to use the cook-pot C the fire unit can be placed on one of the upper pairs of guides 22 or 23 and the roasting pan A used for roasting, baking, or deep fat frying, or the lid 107 of the roasting pan may be used as a griddle as shown in Figure 3. The fire unit B is more fully described and claimed in my copending application Serial No. 390,121, previously referred to. It should be noted that the shutters 45 of any door opening can be pushed back to give access to the fire unit controls during operation of the unit, thus avoiding opening the doors and admitting too much air to the casing.

Further, the manner of constructing the range is one wherein its elements, such as the base, the sides, the back, the front with its two doors, and the top are separately fabricated and, by the use of a few centering pins and clamps, may be fabricated into a complete range with its parts firmly and permanently riveted in place expeditiously and at low cost, there being no machine work required and little or no skilled labor. The parts preferably are of aluminum alloy and steel from standard stock and may be cut in quantity and pressed into the desired form at low cost, as referred to above requiring only a small amount of skilled labor.

This range has now passed the experimental stage, and has finally reached a perfection of construction and operation that is of great value to the Army and satisfactorily meets its requirements.

While there is cooperation between the swinging supporting members and the particular form and arrangement of the parts of the broiler or roaster, shown at the top of the range, the cradle, the fire unit and various containers for cooking a variety of foods which were designed especially for use in the preferred form of range illustrated and described in this application, they are not limited to use in this form of range nor is the range limited to the use with the containers shown, which are included merely for illustrative purposes.

Having thus described my invention, what I claim as new and desire to secure by Letters Patent is:

1. A portable range consisting of a separately fabricated base, separately fabricated side and rear walls, each consisting of vertical side, top, and bottom angles forming frames, oppositely paneled wall sheets adapted to provide insulation spaces therebetween mounted on said frame, said side and rear walls being rigidly mounted on the base and along their adjacent edges, upper and lower cross braces connecting the front edges of the side walls adapted to brace said walls, upper and lower doors having openings therein and consisting of outer and inner sheets with insulation spaces therebetween, said doors being hingedly mounted at their lower edges on said side walls, adapted to form a closure for the front of the range and a folding insulated cover formed of two pieces, hinged to each other and to the rear wall frame adapted to swing in a limited space above and to close the top of the range and provide a range having a closed, unobstructed interior.

2. A portable range comprising a casing having a closed unobstructed interior, a portable heating unit having a vertical front control panel, pairs of opposed slides mounted at different levels on the inner faces of the side walls of the casing, said slides being adapted to support the heating unit at various levels within the range casing, and upper and lower doors hingedly mounted at their lower edges in said casing, said doors having openings provided with slidable closures, one of said openings cooperating with the control panel of the heating unit in each of its positions, whereby access to the heating unit for observation and control thereof is provided through the openings when the doors of the casing are closed to prevent the admission of air to the casing.

3. A portable range comprising a casing having a closed substantially unobstructed interior, a pair of opposed slides mounted on the inner faces of the side walls of said casing, said casing having a door in its front wall hinged to the wall at the level of the slides and guide rails mounted on the interior of said door in alignment with said side slides, and a cradle forming a skeleton support for a cooking utensil of smaller cross section than the casing slidably supported on said slides, and permitting heat to rise around the utensil, said door having means for supporting it in horizontal position when open, whereby the cradle support may be drawn out of the casing onto the door for access to the cooking utensil.

4. A portable range comprising a casing having a closed, substantially unobstructed interior, a portable heating unit for said range, said casing having pairs of opposite slides mounted at different levels on the inner faces of the side walls of the casing, said slides being adapted to support the heating unit at various levels within the casing, a receptacle of substantially smaller cross section than the casing, a cradle forming a skeleton support for said receptacle and slidably supported on a pair of said slides, and a covered cooking utensil of substantially the same shape in plan as the interior of the casing adapted to be supported in the top of said casing and of such size as to extend substantially to the side walls of the casing whereby a restricted passage is formed between the utensil and casing thereby retarding the passage of the gases and acting as a flue.

STLYES T. HOWARD.